March 2, 1937.  C. R. PATON  2,072,180

INTERNAL COMBUSTION ENGINE

Filed Nov. 13, 1933

Inventor
CLYDE R. PATON.

By Milton Tibbetts
Attorney

Patented Mar. 2, 1937

2,072,180

UNITED STATES PATENT OFFICE 2,072,180

INTERNAL COMBUSTION ENGINE

Clyde R. Paton, Birmingham, Mich., assignor to Packard Motor Car Company, Detroit, Mich., a corporation of Michigan Application November 13, 1933, Serial No. 697,722

5 Claims. (Cl. 184—6)

This invention relates to lubricating systems and more particularly to systems for lubricating bearings of an internal combustion engine.

Many internal combustion engines are equipped with a lubricating system having oil treating means, such as a filter, a cooler, or both, arranged in the line between the pump and the bearings. Such systems are provided with a shunt line around the oil treating means, to insure a flow of oil to the bearings, and a relief between the pump and the oil treating means. The relief is controlled by pressure in the line between the pump and the treating means to open a valve above some predetermined pressure, while flow through the shunt line is controlled by a valve responsive to a pressure differential. This pressure differential operated valve is required as the pressure must necessarily be higher between the pump and the oil treating means than it is between the bearings and the oil treating means. Because of such shunt valve the oil pressure at the delivery end of the oil line drops considerably below that desired for high speed engine operation and consequently the bearings are insufficiently lubricated at times with this type of system.

An object of this invention is to provide an engine lubricating system of the type above set forth with means for maintaining the pressure of oil passing to the bearings substantially a predetermined constant.

Another object of the invention is to provide an engine lubricating system of the type described in which oil pressure in the delivery side of the line is utilized to maintain a substantially constant oil pressure at the bearings.

A further object of the invention is to provide a pressure lubricating system having oil treating means in the delivery line in which there is a relief controlled by the pressure of oil in the line beyond the treating means.

Still another object of the invention is to provide a pressure lubricating system for internal combustion engines in which oil pressure in the line adjacent the points to be lubricated is utilized to control the pressure developed in the oil line by the pump to maintain a substantially constant oil pressure at bearings.

Other objects of the invention will appear from the following description taken in connection with the drawing, which forms a part of this specification, and in which.

Figure 1:
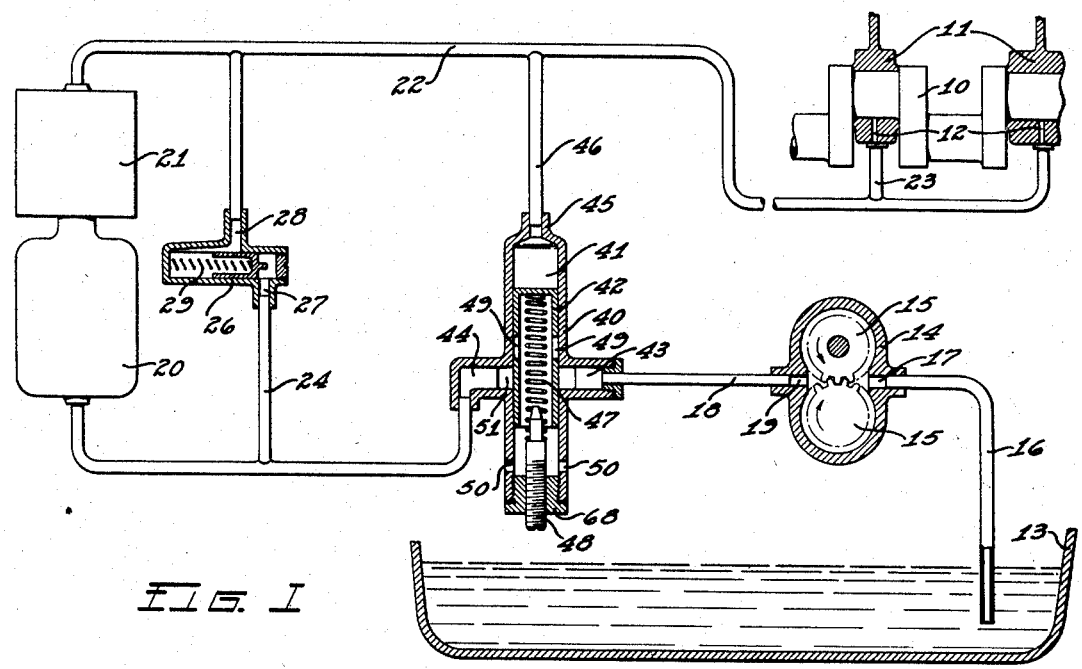
Fig. 1 illustrates diagrammatically a lubricating system incorporating my invention.

Referring now to the drawing by characters of refrence, 10 represents the crank shaft of an internal combustion engine which is carried by bearings 11 having oil feeding passages 12 therein. Below such bearings is arranged a crank case as indicated at 13 and of the usual construction having a sump which collects oil draining from the engine bearings.

Between the bearings and the crank case extends a pressure lubricating system. Within the casing 14 is an engine driven pump consisting of a pair of gears 15, there being a pipe 16 leading from adjacent the bottom of the crank case to the inlet 17 in the pump casing. A feed line 18 leads from the outlet 19 of the pump casing to an oil filter of conventional design, as indicated at 20. Connected with the filter is a conventional oil cooler as indicated at 21 and leading from the cooler is a delivery line 22. The delivery line is connected to one of the bearing passages and branch lines, as indicated at 23, connect the delivery line with other passages leading to bearings. Insofar as this invention is concerned, either the cooler or the filter can be dispensed with without affecting the conditions this invention is designed to improve.

Between the feed line and the delivery line is arranged a shunt line 24 so that oil can pass directly from the feed line to the delivery line when flow through the filter or cooler is unduly restricted. There is also usually associated with the feed line a relief valve which opens at a predetermined pressure to define the maximum pressure in the feed line. In the shunt line, is arranged a flow controlling valve 25 which is slidably arranged in a housing 26 and operated by differential pressure in the lines 18 and 22. This housing is provided with an inlet 27 and with an outlet 28 which is offset from the inlet. A spring 29 is associated with the valve to control the differential range of pressure at which the valve will open and close. It will be seen that the valve is provided with a face which on one side is subjected to the pressure in the feed line and on the other side is subjected to the pressure in the delivery line. It is customary with internal combustion engines to have a pressure differential range of approximately ten or more pounds and, under such circumstances, there can be a reduction of approximately ten pounds in the pressure on the delivery side of the oil line before the differential valve will open. This drop in oil pressure in the delivery line is undesirable in internal combustion engine bearings under many circumstances and particularly when running at high speeds because there will be an insufficient oil delivery.

It is the purpose of this invention to associate with a system of the type above described means for maintaining a substantially constant oil pressure in the delivery line of the system so that the bearings or points to be lubricated will always receive sufficient oil. To this end, I have illustrated two ways in which this result can be attained.

In Fig. 1, I have illustrated the relief valve in the feed line controlled by pressure of oil in the delivery line. A housing 40 is provided with an interior cylindrical portion 41 in which a hollow plunger valve 42 is reciprocably mounted. The housing is provided with an inlet neck 43 and an outlet neck 44 which are connected in and form part of the feed line and are open to the chamber 41. The housing is also provided with a neck 45 which is connected by a pipe 46 with the delivery line. The end of the valve adjacent the neck 45 is closed and subjected to the pressure of oil in the delivery line which pressure is opposed by a coil spring 47 engaging the interior closed end of the valve at one end and an adjustable abutment member 48 at the other end, such abutment member extending through a plug 68 screwed into the lower end of the valve housing. The valve is provided with a pair of ports, as indicated at 49, which can be moved into a position so that oil in the feed line can flow interiorly of the valve to the lower portion of the chamber 41 and thence through ports 50 into the crank case. The housing 40 is provided with an enlarged chamber 51 adjacent the valve to permit unrestricted flow of oil through the housing. The spring is adjusted so that pressure against the valve head will move the ports 49 into an open position with the chamber 51 when a desired oil pressure is present in the delivery line. Under such circumstances, oil will flow from the feed line through the housing and back to the crank case in sufficient quantity to reduce the pressure in the feed line and thus maintain a substantially constant pressure in the delivery line. In this manner, there can be only a very slight fluctuation in the pressure of the oil in the delivery line and the pressure of the oil in the feed line will be controlled within the desired limits. The differential valve will continue to function in its normal manner, as a drop in the pressure of the oil on the delivery side will increase the pressure on the feed side of the line and thus open the valve.

Figure 2:
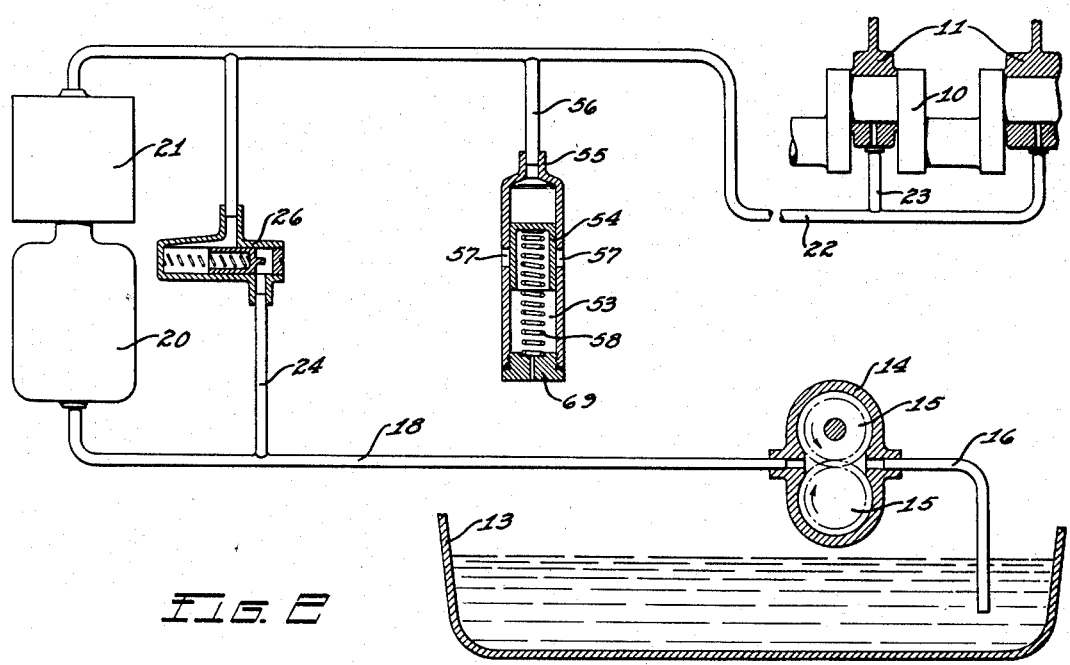
Fig. 2 is another diagrammatic view of the lubricating system incorporating my invention in a modified form.

In Fig. 2, I have shown a relief valve connected only with the return line of the system, this arrangement being preferable when the filter and cooler are of large enough capacity to allow flow therethrough of the pump output. In this instance, there is a valve casing 53 in which a valve 54 is slidably mounted. The casing is formed with a neck 55 which is connected with the feed line by a branch pipe 56. In the walls of the casing there are outlet ports 57 adapted to permit flow of oil from the delivery line to the crank case when uncovered by the valve 54. Within the casing I provide a coil spring 58 which engages the valve and seats against a plug 69 closing the bottom of the housing. The spring exerts a desired pressure against the valve to maintain it in closed position until the predetermined pressure is developed in the return line. Above such predetermined pressure, oil from the delivery line will move the valve 54 into open position so that oil will flow from the line 56 through the ports 57 to the crank case. In this way, the by-passing of oil from the delivery line through the relief valve will maintain a substantially constant oil pressure at the points of delivery.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a lubricating system, the combination with a pressure feed oil line including an oil treating means and a shunt line around the oil treating means controlled entirely by the differential in pressure on opposite sides of said means, of a relief in the line in advance of the oil treating means, and a control for the relief responsive to pressure in the portion of the line beyond the oil treating means.

2. In a lubricating system, the combination with a pressure feed oil line including oil treating means and a shunt line around the oil treating means controlled by a valve opening entirely under the differential in pressure on opposite sides thereof, of a housing connected in the line in advance of the oil treating means having a relief outlet, a spring closed valve in said housing movable to establish communication between the line and the relief outlet, and a connection between the housing and the portion of the line beyond the oil treating means whereby oil from such portion of the line will move the valve to connect the relief outlet with the line in advance of the oil treating means.

3. In a lubricating system, the combination with a pressure feed oil line including an oil treating means and a shunt line around the oil treating means controlled entirely by the differential in pressure on opposite sides of said means, of a relief in the line in advance of the oil treating means, a control valve for the relief, said valve opening in response to pressure in the portion of the line beyond the oil treating means, and adjustable pressure means opposing the opening movement of said valve.

4. In a lubricating system, the combination with a pressure feed oil line including an oil treating means and a shunt line around the oil treating means controlled entirely by the differential in pressure on opposite sides of said means, of a relief in the line in advance of the oil treating means, a valve control for the relief, said valve opening in response to pressure in the portion of the line beyond the oil treating means, means exerting pressure against the valve control in a direction to shut off the relief, and means for regulating the force exerted by the pressure means against the valve control.

5. In a lubricating system, the combination with a pressure feed line including oil treating means and a shunt line around the oil treating means controlled by a valve opening entirely under the differential in pressure on opposite sides thereof, of a housing connected in the line in advance of the oil treating means having a relief outlet, a spring closed valve in said housing movable to establish communication between the line and the relief outlet, a connection between the housing and the portion of the line beyond the oil treating means whereby oil from such portion of the line will move the valve to connect the relief outlet with the line in advance of the oil treating means, and means adjustably associated with said valve for regulating the pressure required to move the same into position establishing communication between said line and said relief outlet.

CLYDE R. PATON.